(12) United States Patent
Balderas

(10) Patent No.: US 9,467,461 B2
(45) Date of Patent: Oct. 11, 2016

(54) COUNTERING SECURITY THREATS WITH THE DOMAIN NAME SYSTEM

(71) Applicant: Akamai Technologies, Inc., Cambridge, MA (US)

(72) Inventor: Manuel A. Balderas, Arlington, MA (US)

(73) Assignee: Akamai Technologies Inc., Cambridge, MA (US)

( * ) Notice: Subject to any disclaimer, the term of this patent is extended or adjusted under 35 U.S.C. 154(b) by 0 days.

(21) Appl. No.: 14/138,025

(22) Filed: Dec. 21, 2013

(65) Prior Publication Data

US 2015/0180892 A1   Jun. 25, 2015

(51) Int. Cl.
*G06F 9/00*       (2006.01)
*H04L 29/06*     (2006.01)
*H04L 29/12*     (2006.01)

(52) U.S. Cl.
CPC ....... *H04L 63/1416* (2013.01); *H04L 61/1511* (2013.01); *H04L 63/1441* (2013.01); *H04L 63/0218* (2013.01)

(58) Field of Classification Search
CPC ........... H04L 63/1416; H04L 61/1511; H04L 63/1441; H04L 63/0218
USPC .......................................................... 726/12
See application file for complete search history.

(56) References Cited

U.S. PATENT DOCUMENTS

| | | | |
|---|---|---|---|
| 6,006,264 A | 12/1999 | Colby et al. |
| 6,108,703 A | 8/2000 | Leighton et al. |
| 6,154,777 A | 11/2000 | Ebrahim |
| 6,185,598 B1 | 2/2001 | Farber et al. |
| 6,405,252 B1 | 6/2002 | Gupta et al. |
| 6,513,061 B1 | 1/2003 | Ebata et al. |
| 7,058,706 B1 | 6/2006 | Iyer et al. |
| 7,194,522 B1 | 3/2007 | Swildens et al. |
| 7,240,100 B1 | 7/2007 | Wein et al. |
| 7,293,093 B2 | 11/2007 | Leighton et al. |
| 7,596,619 B2 | 9/2009 | Leighton et al. |
| 7,676,566 B2 | 3/2010 | Lund et al. |
| 7,680,811 B2 | 3/2010 | Bailey et al. |
| 7,694,016 B2 | 4/2010 | Halley et al. |
| 7,725,602 B2 | 5/2010 | Liu |

(Continued)

FOREIGN PATENT DOCUMENTS

| | | |
|---|---|---|
| EP | 2353259 B1 | 11/2013 |
| WO | WO 2008/053228 A2 | 5/2008 |
| WO | WO 2010/035037 A2 | 4/2010 |

OTHER PUBLICATIONS

Contavalli, C., (IETF Internet Draft), Client Subnet in DNS Requests, draft-vandergaast-edns-client-subnet-02, Jul. 4, 2013, 32 pages.

(Continued)

*Primary Examiner* — Mohammad W Reza

(57) ABSTRACT

Described herein are methods, systems, and apparatus in which the functionality of a DNS server is modified to take into account security intelligence when determining an answer to return in response to a requesting client. Such a DNS server may consider a variety of security characteristics about the client and/or the client's request, as described more fully herein. Such a DNS server can react to clients in a variety of ways based on the threat assessment, preferably in a way that proactively counters or mitigates the perceived threat.

14 Claims, 7 Drawing Sheets

(56) References Cited

U.S. PATENT DOCUMENTS

| | | |
|---|---|---|
| 7,761,570 B1 | 7/2010 | Halley et al. |
| 7,769,826 B2 | 8/2010 | Gustafsson et al. |
| 7,814,180 B2 | 10/2010 | Bailey et al. |
| 7,843,911 B2 | 11/2010 | Wellington et al. |
| 8,250,030 B2 | 8/2012 | Bailey et al. |
| 8,285,823 B2 | 10/2012 | Bailey et al. |
| 8,484,283 B2 | 7/2013 | Afergan |
| 8,498,946 B1 | 7/2013 | Parekh et al. |
| 8,499,077 B2 | 7/2013 | Niemela et al. |
| 8,539,329 B2 | 9/2013 | Wilson |
| 8,583,801 B2 | 11/2013 | Fleischman |
| 8,583,806 B2 | 11/2013 | Fleischman |
| 8,606,926 B2 | 12/2013 | Ulevitch et al. |
| 8,631,489 B2 | 1/2014 | Antonakakis et al. |
| 8,676,989 B2 | 3/2014 | Treuhaft et al. |
| 8,683,079 B2 | 3/2014 | Swildens et al. |
| 8,694,642 B2 | 4/2014 | Dempsky |
| 8,707,429 B2 | 4/2014 | Wilbourn et al. |
| 8,713,188 B2 | 4/2014 | Treuhaft et al. |
| 8,769,060 B2 | 7/2014 | Avirneni et al. |
| 8,769,118 B2 | 7/2014 | Raciborski et al. |
| 8,892,516 B2 | 11/2014 | Bailey et al. |
| 2006/0098645 A1 | 5/2006 | Walkin |
| 2008/0028463 A1 | 1/2008 | Dagon |
| 2010/0121979 A1 | 5/2010 | St. Pierre |
| 2011/0238767 A1 | 9/2011 | Murphy |
| 2011/0283361 A1 | 11/2011 | Perdisci |
| 2012/0117267 A1 | 5/2012 | Holloway |
| 2013/0117418 A1 | 5/2013 | Mutton |
| 2013/0191915 A1 | 7/2013 | Antonakakis |
| 2013/0290563 A1 | 10/2013 | Fleischman |
| 2014/0059216 A1 | 2/2014 | Jerrim |
| 2014/0068763 A1 | 3/2014 | Ward |
| 2014/0068775 A1 | 3/2014 | Ward |
| 2014/0075558 A1 | 3/2014 | Ward |
| 2014/0090058 A1 | 3/2014 | Ward |
| 2014/0101759 A1 | 4/2014 | Antonakakis |
| 2014/0143825 A1 | 5/2014 | Behrendt |
| 2014/0157414 A1 | 6/2014 | Antonakakis |

OTHER PUBLICATIONS

Internet Systems Consortium, Taking Back the DNS, Jul. 29, 2010, 7 pages, downloaded from http://www.isc.org/blogs/taking-back-the-dns/.

Vixie, Paul, Internet Systems Consortium (ISC), DNS Response Policy Zones (DNS RPZ), ISC Technical Note Series, Dec. 2010, 7 pages.

www.iana.org, Domain Name Systems (DNS) Parameters, Feb. 4, 2014, 7 pages, see section on DNS EDNS0 Option Codes, downloaded from http://www.iana.org/assignments/dns-parameters/dns-parameters.xhtml#dns-parameters-11.

Damas, J. (IETF), RFC 6891, Extension Mechanism for DNS (EDNS(0)), Apr. 2013, 16 pages.

Barry Greene, Using DNS to Protect Your Network and Your Customers, In Security, Resiliency, and Scaling Blog, Aug. 20, 2012, available at http://www.senki.org/usingdnstoprotectyournetworkandyourcustomers/.

Press Release, Xerocole Partners with Damballa for Botnet Detection on Carrier Networks, Reuters, Aug. 6, 2012.

Xerocole Inc. white paper, The ABCs of Complying with the FCC Anti-Botnet Code of Conduct, Aug. 2012, 7 pages.

Damballa, Damballa CSP—Cyber Threat Protection for Communications Service Providers, Feb. 2013, 6 pages.

Commtouch Brochure, GlobalView Mail Reputation Service, 2007.

Commtouch website pages, IP Reputation, dated Aug. 2013 at http://web.archive.org/web/20130806203609/http://www.commtouch.com/vendor-ip-reputation/, 4 pages.

Project Honey Pot Services, dated Jul. 2013 at https://web.archive.org/web/20130727185911/http://www.projecthoneypot.org/services_overview.php, 2 pages.

Webroot, Webroot Reputation Service datasheet, 2011, 2 pages.

dshield.org, About the Internet Storm Center, dated Oct. 2013 at https://web.archive.org/web/20131005170931/http://dshield.org/about.html, 4 pages.

Symantec, Researching IP address reputation, dated Aug. 20, 2012, web page printout 16 pages, available at https://support.symantec.com/en_US/article.HOWTO54072.html.

Nygren et al., The Akamai Network, A Platform for High-Performance Internet Applications, ACM SIGOPS Operating Systems Review, vol. 44, No. 3, Jul. 2010.

International Search Report and Written Opinion for counterpart International PCT Application No. PCT/US2014/070832, mailed Mar. 13, 2015, 11 pages.

Contavalli et al., Client Subnet in DNS requests, draft-vandergast-edns-client-subnet-02.txt, IETF, Standard Working Draft, Jul. 5, 2013, 32 pages.

P. Vixie, ISC, RFC 2671, Extension Mechanisms for DNS (EDNS0), Aug. 1999, 7 pages.

P. Mockapetris, RFC 1035, Domain Names—Implementation and Specification, Nov. 1987, 55 pages.

COUNTERING SECURITY THREATS WITH THE DOMAIN NAME SYSTEM

BACKGROUND

1. Technical Field

This application generally relates to distributed data processing systems, to the Internet and the domain name system (DNS), and to cyber-security and attack mitigation techniques.

2. Brief Description of the Related Art

Internet resources are located using Internet Protocol (IP) addresses. IP addresses typically point to a machine, or set of machines, depending on network configurations. In the past, the IPv4 protocol has been used for these addresses, but more recently, primarily due to the explosion of connected devices and the need for a larger address space, a transition to IPv6 addressing has begun.

The domain name system (DNS) is a system that maps human-friendly names to IP addresses. DNS is a hierarchical system made up of DNS servers, also referred to as name servers, that are configured with software running on appropriate hardware to provide application layer name lookup services. Individual DNS servers may be managed by many different entities, public, quasi-public, or private, depending on their role and function. Generally speaking, given a request to resolve a given hostname, such as www.foo.com, the DNS system returns a set of one or more IP addresses pointing to machines that provide resources (e.g., content from a web server or media server, services accessed through an application programming interface) associated with that domain name. Various intermediate steps, including recursive lookups and name aliasing (e.g., canonical name or CNAME), may occur in the lookup process.

Some DNS servers are recursive DNS servers, which are usually the type provided by an Internet Service Provider for its subscribers. These DNS servers typically resolve hostnames on behalf of end-user devices, such as a person's laptop, tablet, or smartphone. More recently, public or so-called 'open' DNS servers have become more popular. Such public DNS servers allow virtually anyone (not just ISP subscribers) to make requests and get DNS answers.

Some DNS servers are authoritative DNS servers that are designated as authoritative for particular domains. Such DNS servers typically respond to requests from recursive DNS servers (which may then cache the response, enhancing the scalability of the system).

A wide variety of information about the domain name system is available. RFC 1035, among many others, specifies message formats, rules, and mechanisms used in DNS. RFC 2671 specifies extension mechanisms to DNS. RFC 6891 refines those extension mechanisms. One such extension currently under development is called the EDNS0 client subnet extension mechanism, which specifies a mechanism by which a given DNS server can include client IP address information (e.g., an IP address or a portion thereof, as defined by a netmask) about the originator of the request when it makes an upstream request to another DNS server. More information is provided in an IETF (Internet Engineering Task Force) draft titled "Client Subnet in DNS Requests" by C. Contavalli et al., Jul. 4, 2013.

Due to its central role in the operation of the Internet, the domain name system is sometimes the target of attack, or, just as maliciously, used by attackers to find machines that they wish to attack, such as those hosting a particular website or web application. The systems, methods, and apparatus described herein can be used to enhance the security of the domain name system and the Internet resources located using it, and provide other benefits and advantages that will become clear in light of the teachings hereof.

SUMMARY

According to this disclosure, a DNS server is modified to take into account security intelligence when determining a DNS answer to return in response to a client. Such a DNS server may consider a variety of security characteristics about the client and/or the client's request, as described more fully herein. Such a DNS server can react in a variety of ways based on the security assessment, preferably in a way that proactively counters or mitigates the perceived threat.

For example, a DNS server might respond with different IP addresses (or more specifically, different sets of one or more IP addresses) depending on the security assessment. The different sets of IP addresses can be used, for example, to direct the client to certain machines as a threat mitigation strategy. Hence for "high-threat" clients, the client may be directed to machines equipped to deal with the perceived threat in a desired way, by virtue of them running particular security software, their capacity, their location, their configuration or other feature.

Alternatively, the DNS server might not respond to clients that are determined to be a threat. Or the DNS server might respond with misleading, unhelpful, or delayed answers. A variety of countermeasures may be available; the particular countermeasures to invoke can depend on the particular security characteristics, threat level and situation, and will be described in more detail herein.

In a preferred embodiment, a given DNS server leverages an IP reputation service to score a client and thereby determine a threat level based on the IP address of the requesting client. Other factors such as the location (e.g., country or network) of the requesting client, request rate history, and the like may also be incorporated into the assessment.

In some instances, the DNS server taking such countermeasures is a recursive DNS server, in which case the requesting client is generally an end-user client machine. However, the teachings hereof may also be implemented in an authoritative DNS server, in which case the authoritative DNS server can base its answer on the security characteristics of a requesting "client" DNS server, or preferably, on the security characteristics of the end-user client that originated the DNS request. This latter approach preferably leverages a mechanism allowing visibility into end-user client IP address information, such as the Enhanced DNS0 client subnet extension field.

The subject matter described herein has a wide variety of applications in content delivery and online platform architectures. The teachings hereof can be used advantageously in a DNS service provided by a content delivery network (CDN), to better control and mitigate threats directed against the CDN's distributed content server platform, among other things.

The foregoing description merely refers to examples of the invention for purposes of overview. It is not limiting and the teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The subject matter of this document will be more fully understood from the following detailed description taken in conjunction with the accompanying drawings, in which.

DETAILED DESCRIPTION

Figure 1:
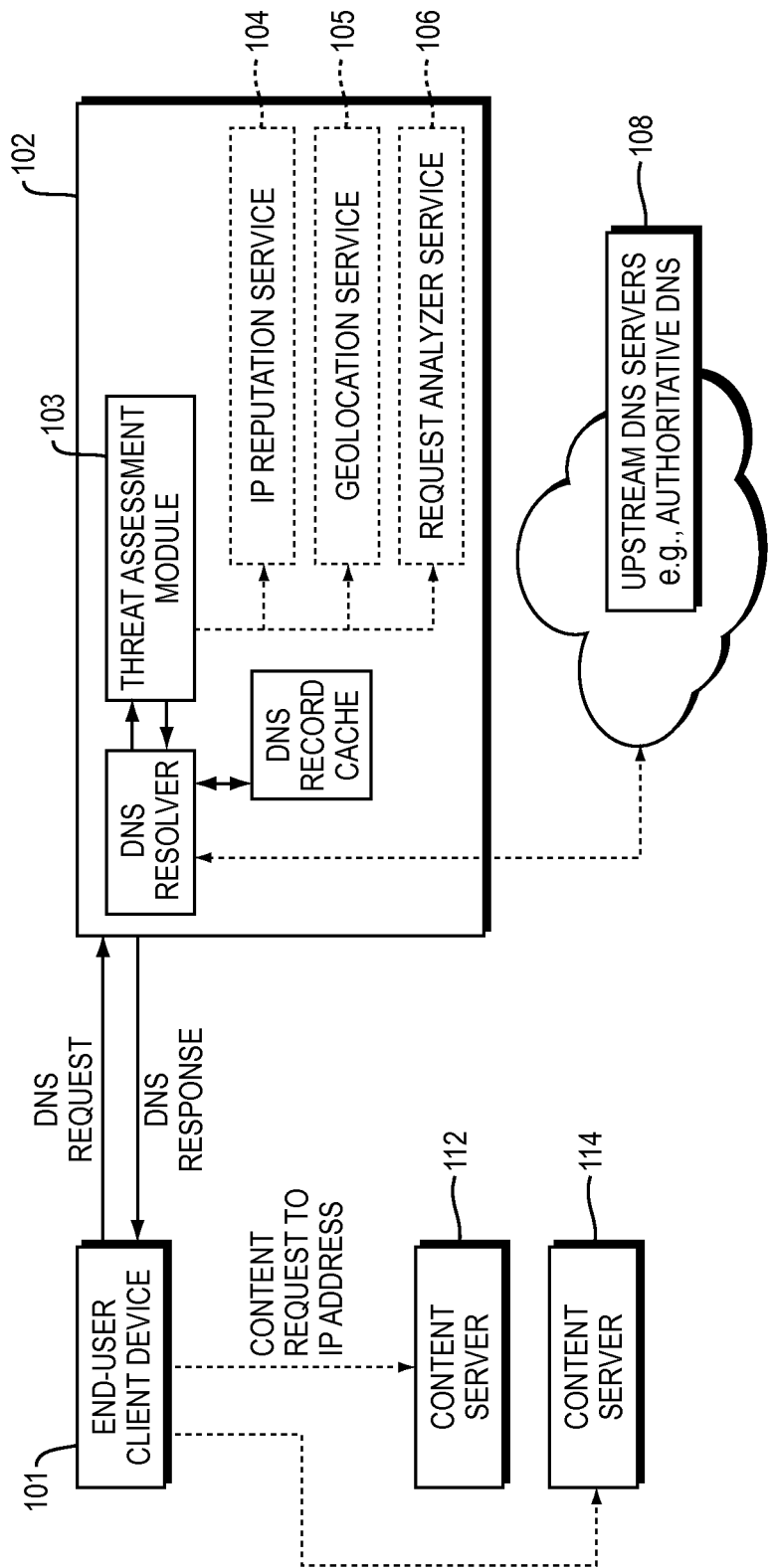
FIG. 1 is a schematic diagram illustrating an embodiment of a system in which a recursive DNS server assesses and mitigates a threat posed by a requesting client device.

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. In this document, the term 'e.g.' is used as an abbreviation for the non-limiting phrase "for example."

Introduction

In accordance with the teachings hereof, a conventional DNS server (e g, running name service software such as BIND) can be modified to have the ability to consider security intelligence when determining an answer to return in response to resolve a domain name. The security characteristics of the requesting client, e.g., obtained from an IP reputation service built into or otherwise available to the DNS server, are preferably used to decide whether to provide a "real" or "default" answer—that is, internet protocol (IP) addresses or aliases that will point the client to content servers providing content under the given domain name—or a "misleading" or "false" answer—for example, an answer that points to slower content servers, or servers that are equipped with additional security mechanisms, tarpits, honeypots, or the like, and which may or may not have content associated with the domain name. A variety of countermeasures are possible. The particular choice of answer may depend on what is known about the client, the severity of threat assessment, and the level of confidence of the threat assessment.

The teachings hereof apply in several different contexts. Implemented in a recursive DNS server, the requesting client is typically an end-user client device. The IP address of the end-user device is known to the DNS server since it generally receives the DNS query from the client device and the request includes a source IP address. In the case of an intermediate recursive DNS server or an authoritative DNS server, the IP address of the end-user client device that originated the query may not be known, as typically the query is received from another DNS server. In such cases, the DNS server can use the IP address of the requesting "client" DNS server. Preferably, however, the DNS server obtains the end-user client device IP address, or alternatively a portion of the IP address preferably including the network and client subnet, using the EDNS0 client subnet extension field, which allows a requesting DNS server to pass DNS query originator IP address information to an upstream DNS server.

The teachings hereof apply without limitation to a DNS service provided by a content delivery network (CDN). In such a context, the teachings hereof may be used by the CDN to better control and mitigate threats directed against the CDN's distributed content server platform. Typically a CDN has many distributed resources and can classify these resources in terms of service and capabilities. Thus, clients that are deemed to be threats or potential threats can be given answers that direct the clients to particular sets of machines in the CDN (sometimes called regions or point of presence or POP) that may be designated for handling such traffic. Such sets of machines may be lower-performing (e.g., allowed to suffer heavier loads and/or DDOS attacks, so that the rest of the CDN may perform better) and/or may have built-in enhanced security mechanisms, such as enhanced malware detection, firewalls, reduced feature sets, tarpits, and/or enhanced logging for subsequent analysis. Such sets of machines may or may not store/permit access to the "normal" resources otherwise available to clients. In the context of a typical CDN with reverse proxy servers, this may mean that the servers simply do not provide the requested content, or provide alternate content. Alternatively, they may retrieve content from an origin server, but cache content with increased time-to-live (TTLs) than elsewhere in the CDN, so that heavy request load/attacks on the CDN infrastructure result in relatively fewer forward requests back to origin.

System Example

FIG. 1 illustrates a system embodiment in which a recursive DNS server 102 receives a request resolve a domain name from an end-user client device 101 and makes a threat assessment. The recursive DNS server 102 may be a local DNS server managed by the end-user's ISP or wireless carrier, a public or open DNS server, or otherwise. As illustrated with dotted lines, the IP address(es) returned by the DNS server 102 will be used by the client device to address a content request to a content server machine. Thus, assuming the DNS server 102 returns an IP address associated with content server 112, the client device 101 can direct a request to that content server 112. But if the DNS server 102 returned the IP address for content server 114, the client device 101 would direct its request to that content server 114.

As illustrated in FIG. 1, the recursive DNS server 102, via threat assessment module 103, accesses a variety of services 104-106 to provide security intelligence and determine a threat level of the client device 101.

Preferably, IP reputation service 102 is used to look up the reputation of the requesting client device 101 based on its IP address. A variety of commercial IP reputation databases are available from various vendors, including for example Symantec, CommTouch, Webroot, and others. Moreover, open source IP reputation projects such as Honeypot and dshield.org can be leveraged. The reputation service may be located locally or remotely to the DNS server 102.

The reputation service 104 typically returns a threat score and a confidence number of the given score. The DNS server may combine this score with other factors, such as the location of the client from location service 105 (e.g., which could be geographic location based on IP address or network location based on IP address), request history of the client known to the DNS server 102 (e.g., the rate at which that client has been sending requests in some time period), or information about the DNS request itself as determined by a request analyzer service 106 (e.g., malformed headers, or suspicious content, as may be detected by firewall rules) to arrive at an overall threat level assessment.

Generalizing, the DNS server 102 may employ any kind of security intelligence and/or services such as 104-106, independently or in combination, to make a threat assessment.

The DNS server 102 returns an answer based on the overall threat level, and how that level compares to pre-defined thresholds/categories with which the DNS server 102 is configured. Depending on the threat level, the DNS server 102 may not perform a recursive lookup within the DNS system (i.e., to authoritative DNS servers) per usual name resolution procedures, but rather perform some pre-defined, configured action. For example, the configured action may be to return a particular IP address that represents and points to resources specifically designed to handle threats. For example, an ISP operating the DNS server 102 may have particular ISP resources to handle this situation.

In other cases, the DNS server 102 may perform the recursive lookup, but use a DNS extension field to inform an upstream DNS server 108 of the threat, with a field indicating a threat score that the DNS server 102 has determined for the particular client, so that the upstream DNS server may tailor its answers accordingly. Then, the DNS server 102 can relay the answer (e.g., the IP address) that it gets from the upstream DNS server 108 (e.g., the authoritative server), which is presumed to have taken the threat characteristics into account. Along these lines, answers from upstream DNS servers 108 may be annotated according to an agreed-upon format so that the DNS server 102 can cache them appropriately. For example, some answers may be marked as valid only for "no-threat" or "low-threat" clients that have a threat score below a defined threshold. (A common scoring system can be agreed upon.) Other answers can be marked as valid to return for "medium-threat" clients, "high-threat" clients, and so on.

Figure 2:
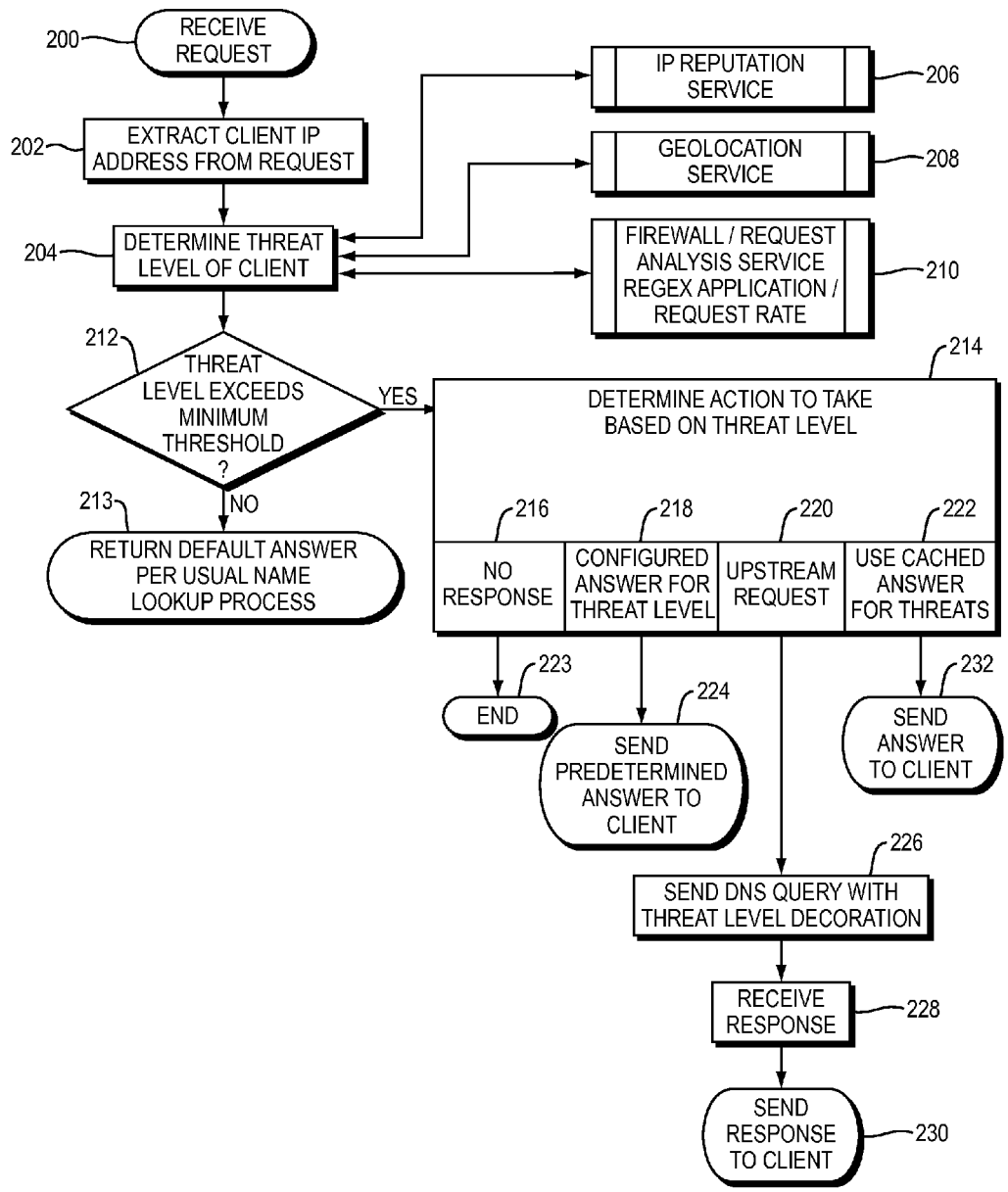
FIG. 2 is a diagram illustrating an embodiment of a workflow for the recursive DNS server shown in FIG. 1 to assess and mitigate a threat.

FIG. 2 illustrates a workflow for the DNS server 102 of FIG. 1, in one embodiment. In FIG. 2, the flow starts at 200 where the DNS server receives a request to resolve a particular domain name from a particular client device. At step 202, the DNS server 102 determines the IP address of the requesting client device, e.g., by reading it from the source IP field of the incoming packets. At step 204, the DNS server 102 determines the threat level of the client. This may involve invoking a variety of processes and/or local or remote services 206-210 to examine the security characteristics of the client. As previously mentioned, the DNS server 102 may leverage an IP reputation service 206, a geo-location service 208, and/or invoke a process that examines the request in more detail (e.g., applying firewall rules and regular expression matches, and the like) as indicated by box 210. The 'Request Rate' shown in box 210 may be the absolute number of requests per unit time for the given client and/or the rate of different requests that a particular client is asking. The rate of different requests is pertinent to detecting a bot or automated scraper, which is more likely to ask different name resolutions more frequently compared to a human user.

The characteristics/score returned from the service is used to calculate a threat level score. If more than one service is used, then the various characteristics/scores returned from the services 206-210 are combined into an aggregate threat level score. At step 212 the threat level score compared with a configured threshold below which all clients are considered "good". If the client does not trigger this threshold, then the DNS server 102 invokes normal name server processing to provide an answer to the client, as indicated by step 213. Step 213 may involve retrieving a record from cache or performing a recursive lookup process with other DNS servers to obtain the appropriate answer, as known in the art for DNS server operation.

If the client exceeds the threshold threat level, then at step 214 the DNS server 102 must determine what action to take. A variety of configurable options may be available, and the DNS server 102 may choose amongst them based on the severity of threat. In other words, in some embodiments, the DNS server 102 may maintain several different threat level categories, bracketed by threat level scores, and may take a different, configurable action in response to a client falling in each category.

Explanations of possible actions are provided below. It should be understood that the actions are meant to be illustrative and not an exhaustive list of potential actions, nor represent actions that are necessary/required:

Box 216: Provide no response to the client. Client may be blacklisted.

Box 218: Invoke a predetermined response according to static configuration. For example, return localhost address '127.0.0.1' to the client, or one or more IP addresses that point to resources in the ISP that are pre-configured to handle and mitigate threats (e.g., tarpits, honeypots, security-hardened machines, to a "managed" proxy that obtains content for the client but also observes client actions in a security context). These machines may or may not have content associated with the requested domain name.

Box 220: Attempt to resolve name but annotate upstream DNS queries with threat score according to pre-arranged format/protocol. Receive answer from upstream DNS server and provide to client. Answer from upstream DNS may be designated with flag/header field, etc., as valid for caching and use with clients exhibiting a particular threat level. Both of these fields are proposed as a DNS semantic for caching in security/threat situations, in accordance with the teachings hereof.

Box 222: Retrieve answer from local cache of DNS server, using a cached answer designated for use with clients that exhibit the determined threat level. This action would typically follow when the box 220 action has occurred previously and the resulting answer cached.

Figure 3:
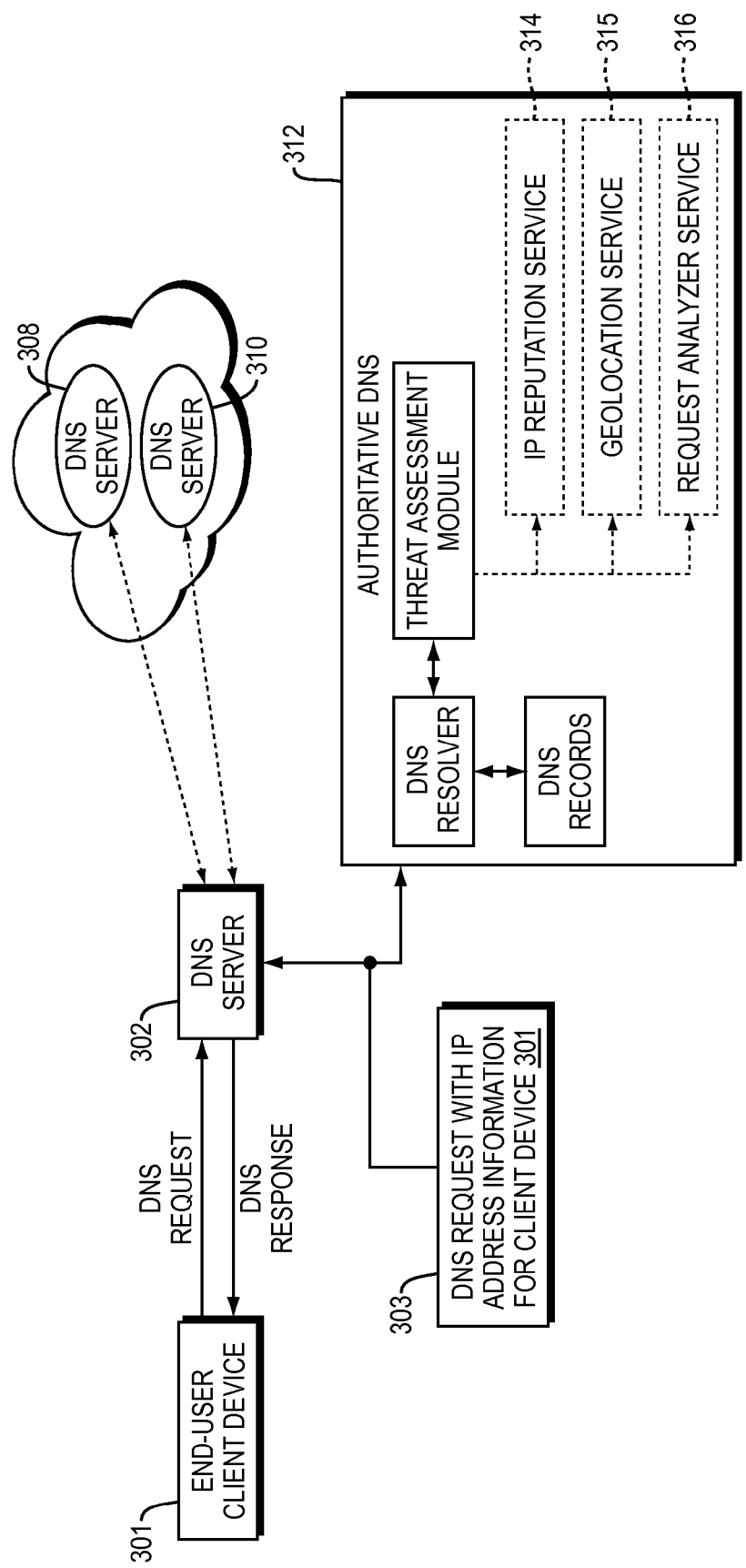
FIG. 3 is a schematic diagram illustrating an embodiment of a system in which an authoritative DNS server assesses and mitigates a threat posed by a requesting client device.

FIG. 3 illustrates a system embodiment in which the recursive DNS server 302 does not make a threat assessment itself but instead passes information upstream. More specifically, in FIG. 3, end-user client device 301 sends a request to resolve a domain name to recursive DNS server 302. Assume the DNS server 302 does not have the answer cached, and that it initiates a recursive lookup process. In this process, the DNS server 302 may contact one or more other DNS servers (including top level domain (TLD) name servers, etc.) before reaching the authoritative DNS server that can provide an IP address for the given domain name. This process is well-known in the art and illustrated generically in FIG. 3 by the dashed lines to DNS servers 308, 310. Assume that the DNS server 302 is eventually told to contact DNS server 312, which is authoritative for the domain name that was requested by the client 301. DNS server 302 sends a request to DNS server 312 with a client subnet extension field specifying the subnet of client device 301 (e.g., a truncated IP address whose truncation is indicated by a netmask field). A mechanism for doing this is specified in the EDNS0 client subnet extension proposal of the IETF (Internet Engineering Task Force) by C. Contavalli et al., Jul. 4, 2013 (titled "Client Subnet in DNS Requests") which describes functionality and data fields for providing network and client subnet extension portions of a client IP address in a DNS request and in an answer (for caching purposes). The fully specified client IP address—without truncation—also be sent.

In this embodiment, authoritative DNS server 312 makes a threat determination in any manner as was described above with respect to recursive DNS server 102 in FIGS. 1-2, leveraging security intelligence and services such as 314-316. Preferably, the DNS server 312 leverages a client IP reputation service and uses the client IP address information provided by the downstream DNS server 302 to make a threat level assessment.

If the client IP address information is not available, a threat assessment can be made using the IP of the requesting DNS server, although the confidence level of the threat assessment generally would be lower because as a result. Note that, as mentioned with respect to FIG. 1, in an alternate embodiment the downstream DNS server 302 can determine a threat level score based on client device's 301 IP address and pass that assessment to the authoritative DNS server 302 with its DNS request 303. In that case, the authoritative DNS 312 determines how to proceed in light of supplied threat score, and it does not have to rely on the IP address of the requesting DNS server for scoring.

DNS server 312 returns an answer based on the determined threat level score. Preferably, the answer is a set of IP addresses that is denoted such that downstream DNS server 302 knows to cache the answer as valid only for requests from client IP addresses falling within the given specified subnet, or for clients falling within a certain threat score range.

Figure 4:
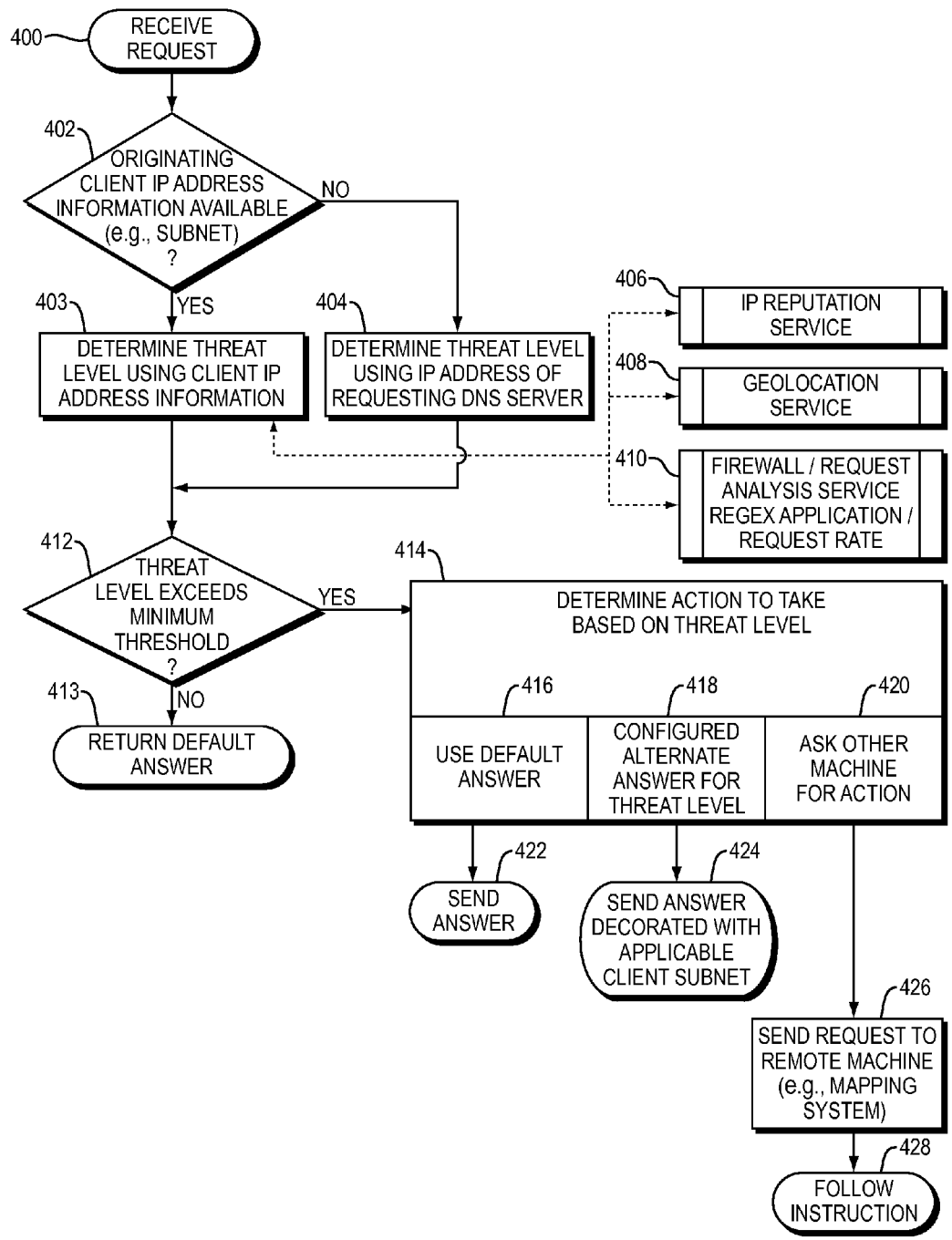
FIG. 4 is a diagram illustrating an embodiment of a workflow for the authoritative DNS server shown in FIG. 3 to assess and mitigate a threat.

FIG. 4 illustrates an embodiment of a workflow for the authoritative DNS server 312. In FIG. 4, the flow starts at 400, where the DNS server 312 receives a request to resolve a domain name from a downstream DNS server. The DNS server 312 checks the request to see if client IP address information is included (e.g., the EDNS0 extension field value indicating network portion and client subnet portion of IP of the client that originated the request). If so, control branches to 403, where the DNS server 312 determines a threat level using the given client IP address information and leveraging various services such as an IP reputation module, geo-location module, request analyzer service, and the like. If no such information has been included, then the DNS server 312 evaluates the threat level using the IP address of the requesting DNS server, as indicated by box 404.

At box 412, the determined threat level is compared to a threshold level. If the level does not exceed the configured minimum threshold, the DNS server 312 proceeds in a conventional manner to obtain an answer from its DNS records (e.g., the answer typically being a set of one or more IP addresses, or possibly a CNAME alias, or other answer according to domain name system conventions) and responds to the requesting DNS server with the answer. If the level exceeds the minimum threshold, then flow moves to box 414 where the DNS server 312 determines what alternative action to take. A variety of actions are possible. FIG. 4 illustrates some examples of possible actions: the DNS server 312 can (i) make note of the request, but return an answer as usual (416), (ii) invoke a configured response for the given threat level category (418) such as an alternate set of IP addresses, or (iii) ask another service or machine, such as a mapping system or threat mitigation in a CDN for the response that should be provided (420). This last option may be useful where the alternate set of IP addresses may need to change rapidly over time in response to server loads and/or attacks. Boxes 422-424 indicate how the DNS sever 312 may include an EDNS0 client subnet extension field in its answer, so that downstream DNS servers like DNS server 302 may cache the answer and use it to answer future requests only from clients falling within the indicated subnet.

The use of the requesting DNS server's IP address for the IP reputation service lookup indicated by box 404 is not ideal, as both low-threat and high-threat clients may be originating DNS queries to that DNS server. Therefore, the minimum thresholds for taking countermeasure action in this case may be higher than otherwise, so as to avoid false positives. Put another way, preferably this approach is used in limited circumstances, such as where the threat level score for the requesting DNS server is very high. Also, this approach might be used if it is desired to block traffic from a certain geography or certain network/ISP associated with the DNS server and/or otherwise treat such traffic in a special manner.

Alternatively, when the originating client IP address information is not known, the DNS server 312 does not invoke threat assessment routines but returns an answer pointing to a content server in a default manner. Since the content server will be contacted directly by the end-user client machine with a content request, and thus have the client IP address, the content server can assess the threat at that time. Assuming a threat is detected, the content server can mitigate the threat itself or respond to the client's request with a redirect (e.g., HTTP 302 redirect) sending the client to a different domain name that has been reserved for threats and that is recognized at the DNS server 312 as such (assume the DNS server 312 is also authoritative for this "red flag" domain name). When the client attempts to resolve this "red flag" domain name, the DNS server 312 knows that originating client of the DNS query is a threat. In other words, the DNS server 312 is configured to recognize that all name resolution requests to the red flag domain should be resolved to resources that can mitigate the threat or otherwise as set out by box 414 of FIG. 4.

Countermeasure Examples

A wide variety of threat mitigation or countermeasure actions may be taken. In addition to those that are described elsewhere in this disclosure, a DNS server might take any of the following actions, in certain embodiments, upon detection of a threat:

Do not answer DNS request.

Provide lower quality of service to "high-threat" clients, so as a preserve resources for low-threat clients. This may involve sending such "high-threat" clients to designated sets of machines (containing the attack regardless of load on those machines) or sets of machines that are high-latency (sending attack to low-load deployments located far away). This may also involve taking longer to respond to such clients, slowing them down.

Provide IP address(es) for content servers that are configured with tarpitting mechanisms, honeypot mechanisms, enhanced logging mechanisms.

Provide IP address(es) for content servers that have network and/or application layer firewalls that are configured to be more strict than "default" content servers (less concern for false positives).

Provide IP address(es) for content servers that have application layer hurdles built-in, e.g., bot challenges/user validation modules).

Send answer that misdirects and/or misleads the client, such as localhost 127.0.0.1, the client's own IP address (source IP), or a broadcasting address such as 255.255.255.0, and/or an address reserved for an internal network such as 10.x.x.x.

Use with Content Delivery Networks

The techniques described above are advantageously employed in a content delivery network. Content delivery networks (CDNs) are known the art as a kind of distributed computing system. Often a CDN is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, typically content providers. The infrastructure is generally used for the storage, caching, or transmission of content—such as web pages, streaming media and applications—on behalf of such content providers. The platform may also provide ancillary technologies used therewith including, without limitation, DNS query handling, provisioning, data monitoring and reporting, content targeting, personalization, and business intelligence.

The DNS service provided by a CDN may be a name service for its own managed servers or a name service productized for customer servers. In either case, it may be modified to employ the DNS security features described herein. Because a CDN typically has many resources deployed in a variety of locations, the result of the security analysis can be used in a variety of ways. For example:

A "bad" client could be directed, via returned IP address, to a set of machines deployed in the CDN to handle attacks, or to a suboptimal (e.g., topologically distant) but low-load set of machines that may be able to handle the potential flood of traffic (e.g., in DDOS attack). Since the client has been found to be bad, the high-latency performance provided by the distant machines is not an issue.

Coordinated Action

The CDN's DNS could return an IP address (preferably a virtual IP) that maps to a particular CDN content server(s), referred to as a 'red flag' address. The CDN machine(s) recognizes that requests made to that red flag address indicate a threat level, so extra security procedures are invoked.

Information about particular end-user client machines captured at the content servers (e.g., whether their content requests triggered firewall rules or they exhibited excessive rate requests) can be fed back to the DNS system for use in the IP reputation service in an out-of-band communication channel.

Figure 5:
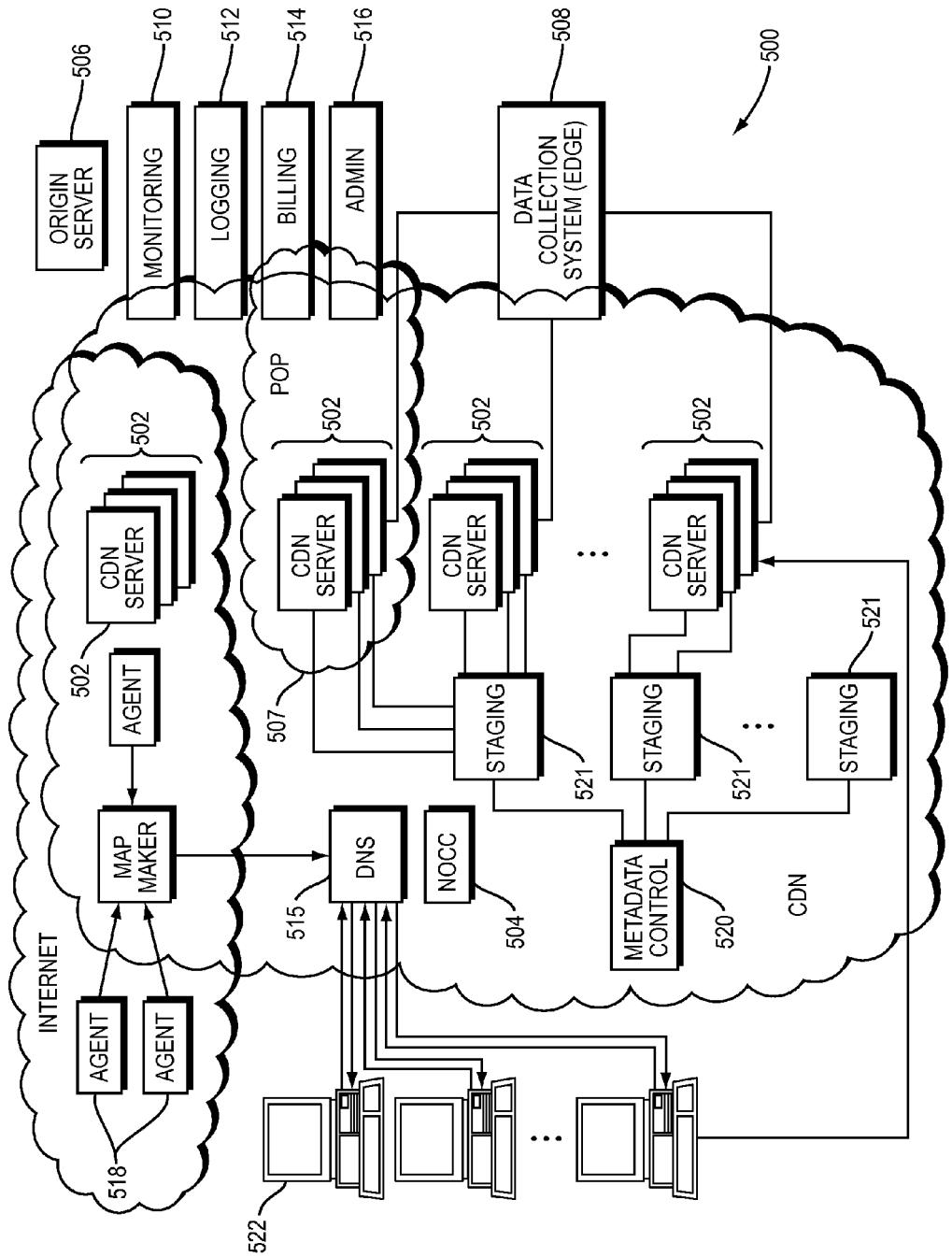
FIG. 5 is a schematic diagram illustrating an embodiment of a distributed computer system configured as a content delivery network (CDN) in which the teachings hereof can be implemented.

FIG. 5 illustrates a CDN system that can be adapted in accordance with the teachings hereof. As shown in FIG. 5, the content delivery network (CDN) has a set of machines distributed around the Internet. Typically, most of the machines are CDN content servers 502 located near the edge of the Internet, i.e., at or adjacent end user access networks. A network operations command center (NOCC) 504 may be used to administer and manage operations of the various machines in the system. Third party sites affiliated with content providers, such as web site 506, offload delivery of content (e.g., HTML or other markup language files, embedded page objects, streaming media, software downloads, and the like) to the distributed computer system 500 and, in particular, to the CDN servers 502 (which are sometimes referred to as content servers, or sometimes as "edge" servers in light of the possibility that they are near an "edge" of the Internet). Such servers may be grouped together into a point of presence (POP) 507 at a particular geographic location.

Typically, content providers offload their content delivery by aliasing (e.g., by a DNS CNAME) given content provider domains or sub-domains to domains that are managed by the service provider's authoritative domain name service. The service provider's domain name service directs end user client machines 522 that desire content to the distributed computer system (or more particularly, to one of the CDN servers 502 in the platform) to obtain the content more reliably and efficiently. The CDN servers 502 respond to the client requests, for example by fetching requested content from a local cache, from another CDN server 502, from the origin server 506 associated with the content provider, or other source.

For cacheable content, CDN servers 502 typically employ on a caching model that relies on setting a time-to-live (TTL) for each cacheable object. After it is fetched, the object may be stored locally at a given CDN server until the TTL expires, at which time is typically re-validated or refreshed from the origin server 506.

Although not shown in detail in FIG. 5, the distributed computer system may also include other infrastructure, such as a distributed data collection system 508 that collects usage and other data from the CDN servers 502, aggregates that data across a set of CDN servers at a particular POP, and passes that data to other back-end systems 510, 512, 514 and 516 to facilitate monitoring, logging, alerts, billing, management and other operational and administrative functions. Distributed network agents 518 monitor the network as well as the server loads and provide network, traffic and load data to a DNS query handling mechanism 515. A distributed data transport mechanism 520 may be used to distribute control information (e.g., metadata to manage content, to facilitate load balancing, and the like) to the CDN servers 502 to configure them.

Figure 6:
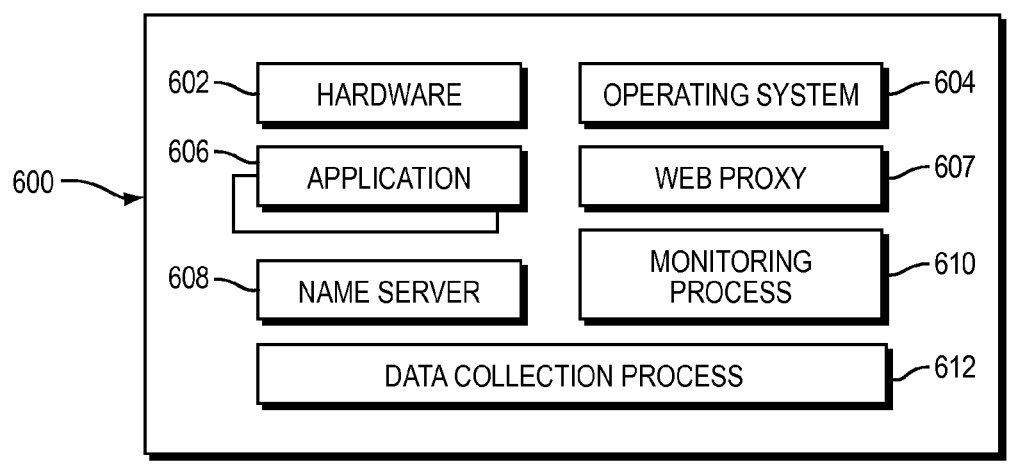
FIG. 6 is a schematic diagram illustrating an embodiment of a machine in the CDN system shown in FIG. 5; and, FIG. 7 is a block diagram illustrating hardware in a computer system that may be used to implement the teachings hereof.

As illustrated in FIG. 6, a given machine 600 in the CDN platform comprises commodity hardware (e.g., a microprocessor) 602 running an operating system kernel (such as Linux® or variant) 604 that supports one or more applications 606. To facilitate content delivery services, for example, given machines typically run a set of applications, such as an HTTP proxy 607, a name server 608, a local monitoring process 610, a distributed data collection process 612, and the like. The HTTP proxy 607 typically includes a manager process for managing a cache and delivery of content from the machine. For streaming media, the machine may include one or more media servers, such as a Windows® Media Server (WMS) or Flash server, as required by the supported media formats.

A given CDN server 502 shown in FIG. 5 may be configured to provide one or more extended content delivery features, preferably on a domain-specific, content-provider-specific basis, preferably using configuration files that are distributed to the CDN servers using a configuration system. U.S. Pat. No. 7,240,100, the contents of which are hereby incorporated by reference, describe a useful infrastructure for delivering and managing CDN server content control information. More information about a CDN platform can be found in U.S. Pat. Nos. 6,108,703 and 7,596,619, the teachings of which are hereby incorporated by reference in their entirety.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server machine associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously.

Computer Based Implementation

The subject matter described herein may be implemented with conventional computer systems, as modified by the teachings hereof, with the processes and functional characteristics an processes described above realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. In one embodiment, an entire network of machines specially suited to handle the security situations described herein may be employed, potentially as a portion of or adjunct the remainder of a content delivery network platform. The DNS servers, described above, may be directed to this special-purpose security network using the teachings described herein.

The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 7:
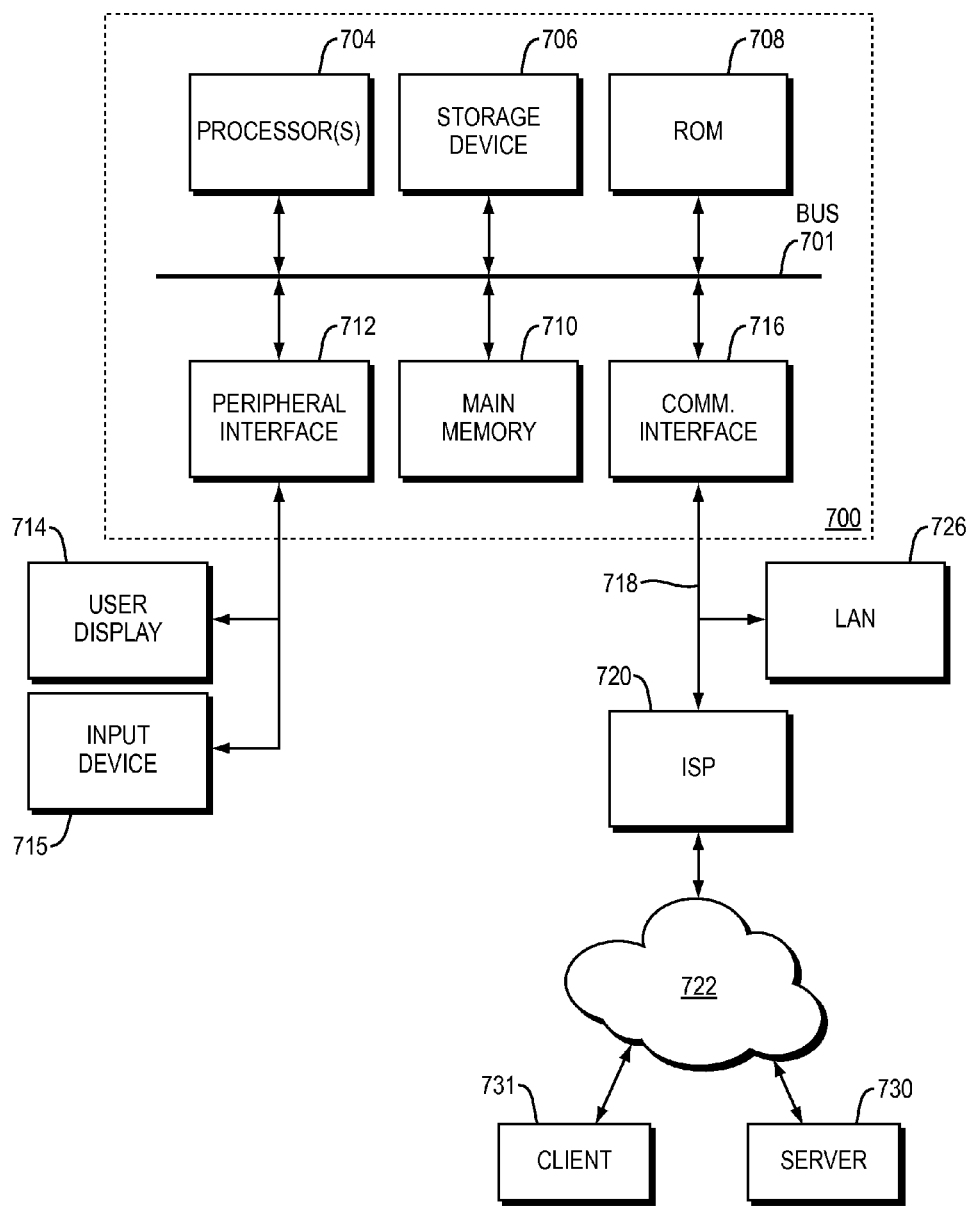

FIG. 7 is a block diagram that illustrates hardware in a computer system 700 in which embodiments of the invention may be implemented. The computer system 700 may be embodied in a client, server, personal computer, workstation, tablet computer, wireless device, mobile device, network device, router, hub, gateway, or other device.

Computer system 700 includes a microprocessor 704 coupled to bus 701. In some systems, multiple microprocessor and/or microprocessor cores may be employed. Computer system 700 further includes a main memory 710, such as a random access memory (RAM) or other storage device, coupled to the bus 701 for storing information and instructions to be executed by microprocessor 704. A read only memory (ROM) 708 is coupled to the bus 701 for storing information and instructions for microprocessor 704. As another form of memory, a non-volatile storage device 706, such as a magnetic disk, solid state memory (e.g., flash memory), or optical disk, is provided and coupled to bus 701 for storing information and instructions. Other application-specific integrated circuits (ASICs), field programmable gate arrays (FPGAs) or circuitry may be included in the computer system 700 to perform functions described herein.

Although the computer system 700 is often managed remotely via a communication interface 716, for local administration purposes the system 700 may have a peripheral interface 712 communicatively couples computer system 700 to a user display 714 that displays the output of software executing on the computer system, and an input device 715 (e.g., a keyboard, mouse, trackpad, touchscreen) that communicates user input and instructions to the computer system 700. The peripheral interface 712 may include interface circuitry and logic for local buses such as Universal Serial Bus (USB) or other communication links.

Computer system 700 is coupled to a communication interface 716 that provides a link between the system bus 701 and an external communication link. The communication interface 716 provides a network link 718. The communication interface 716 may represent an Ethernet or other network interface card (NIC), a wireless interface, modem, an optical interface, or other kind of input/output interface.

Network link 718 provides data communication through one or more networks to other devices. Such devices include other computer systems that are part of a local area network (LAN) 726. Furthermore, the network link 718 provides a link, via an internet service provider (ISP) 720, to the Internet 722. In turn, the Internet 722 may provide a link to other computing systems such as a remote server 730 and/or a remote client 731. Network link 718 and such networks may transmit data using packet-switched, circuit-switched, or other data-transmission approaches.

In operation, the computer system 700 may implement the functionality described herein as a result of the microprocessor executing program code. Such code may be read from or stored on a non-transitory computer-readable medium, such as memory 710, ROM 708, or storage device 706. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 718 (e.g., following storage in an interface buffer, local memory, or other circuitry).

A client device may be a conventional desktop, laptop or other Internet-accessible machine running a web browser or other rendering engine. A client device may also be a forward proxy, Tor node, or cloud provider edge machine. A client device may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method operative in a domain name system (DNS) server, the method comprising:
   receiving a request to resolve a domain name from a client, the client being a recursive DNS server or an end-user device, and the request including an internet protocol (IP) address of the client;
   determining a threat score for the request, based at least in part on the IP address;
   upon a determination that the threat score does not exceed a threshold, responding to the client's domain name resolution request with a first set of one or more IP addresses, wherein the first set of IP addresses is associated with a first set of one or more servers in a first point of presence (PoP) of a content delivery network;
   upon a determination that the threat score exceeds a threshold, responding to the client's domain name resolution request with a second set of one or more IP addresses, wherein the second set of IP addresses is associated with a second set of one or more servers in a second point of presence (PoP) of the content delivery network, the second PoP being remote from the first PoP;
   wherein the second set of one or more IP addresses is selected for inclusion in the response at least in part because the second set of one or more servers in the second PoP are known to have a higher latency for the client than the first set of one or more servers in the first PoP, due to relative locations of the first and the second PoPs.

2. The method of claim 1, wherein the IP address is truncated in accordance with a netmask included in the request.

3. The method of claim 1, wherein the client is a recursive DNS server and the IP address is associated with (i) the recursive DNS server, or (ii) an end-user device that originated the request to the recursive DNS server.

4. The method of claim 1, wherein the client is an end-user device and the IP address is associated with the end-user device.

5. The method of claim 1, wherein determining the threat score comprises sending the IP address to an IP address reputation service and receiving a score therefrom.

6. An apparatus, comprising:
   circuitry forming one or more processors and memory holding program instructions for execution by the one or more processors, an a network interface for communicating with remote machines, the program instructions including instructions for:
   receiving a request to resolve a domain name from a client, the client being a recursive DNS server or an end-user device, and the request including an IP address for the client;
   determining a threat score for the request, based at least in part on the IP address;
   upon a determination that the threat score does not exceed a threshold, responding to the client's domain name resolution request with a first set of one or more IP addresses, wherein the first set of IP addresses is associated with a first set of one or more servers in a first point of presence (PoP) of a content delivery network;

upon a determination that the threat score exceeds a threshold, responding to the client's domain name resolution request with a second set of one or more IP addresses, wherein the second set of IP addresses is associated with a second set of one or more servers in a second point of presence (PoP) of the content delivery network, the second PoP being remote from the first PoP wherein the second set of one or more IP addresses is selected for inclusion in the response at least in part because the second set of one or more servers in the second PoP are known to have a higher latency for the client than the first set of one or more servers in the first PoP, due to relative locations of the first and the second PoPs.

7. The apparatus of claim 6, wherein the IP address is truncated in accordance with a netmask included in the request.

8. The apparatus of claim 6, wherein the client is a recursive DNS server and the IP address is associated with (i) the recursive DNS server, or (ii) an end-user device that originated the request to the recursive DNS server.

9. The apparatus of claim 6, wherein the client is an end-user device and the IP address is associated with the end-user device.

10. The apparatus of claim 6, wherein determining the threat score comprises sending the IP address to an IP address reputation service and receiving a score therefrom.

11. A non-transitory computer readable storage medium, storing one or more programs for execution by one or more processors of a computer apparatus, wherein the one or more programs include instructions for:

receiving a request to resolve a domain name from a client, the client being a recursive DNS server or an end-user device, and the request including an IP address for the client;

determining a threat score for the request, based at least in part on the IP address;

upon a determination that the threat score does not exceed a threshold, responding to the client's domain name resolution request with a first set of one or more IP addresses, wherein the first set of IP addresses is associated with a first set of one or more servers in a first point of presence (PoP) of a content delivery network;

upon a determination that the threat score exceeds a threshold, responding to the client's domain name resolution request with a second set of one or more IP addresses, wherein the second set of IP addresses is associated with a second set of one or more servers in a second point of presence (PoP) of the content delivery network, the second PoP being remote from the first PoP wherein the second set of one or more IP addresses is selected for inclusion in the response at least in part because the second set of one or more servers in the second PoP will have a higher latency for the client than the first set of one or more servers in the first PoP, due to relative locations of the first and the second PoPs.

12. The computer readable storage medium of claim 11, wherein the client is a recursive DNS server and the IP address is associated with (i) the recursive DNS server, or (ii) an end-user device that originated the request to the recursive DNS server.

13. The computer readable storage medium of claim 11, wherein the client is an end-user device and the IP address is associated with the end-user device.

14. The computer readable storage medium of claim 11, wherein determining the threat score comprises sending the IP address to an IP address reputation service and receiving a score therefrom.

* * * * *